United States Patent
Lewis (10) Patent No.: US 11,505,499 B2
(45) Date of Patent: Nov. 22, 2022

(54) GREEN CERAMIC MIXTURES COMPRISING A STABILIZED EMULSION AND METHODS FOR FORMING A CERAMIC BODY

(71) Applicant: CORNING INCORPORATED, Corning, NY (US)

(72) Inventor: Mark Alan Lewis, Horseheads, NY (US)

(73) Assignee: Corning Incorporated, Corning, NY (US)

(*) Notice: Subject to any disclaimer, the term of this patent is extended or adjusted under 35 U.S.C. 154(b) by 234 days.

(21) Appl. No.: 16/954,233

(22) PCT Filed: Dec. 16, 2018

(86) PCT No.: PCT/US2018/065895
§ 371 (c)(1),
(2) Date: Jun. 16, 2020

(87) PCT Pub. No.: WO2019/125972
PCT Pub. Date: Jun. 27, 2019

(65) Prior Publication Data
US 2020/0317580 A1 Oct. 8, 2020

Related U.S. Application Data

(60) Provisional application No. 62/607,593, filed on Dec. 19, 2017.

(51) Int. Cl.
*C04B 35/195* (2006.01)
*C04B 35/626* (2006.01)
(Continued)

(52) U.S. Cl.
CPC .......... *C04B 35/195* (2013.01); *C04B 26/285* (2013.01); *C04B 35/6264* (2013.01);
(Continued)

(58) Field of Classification Search
CPC .............. C04B 35/195; C04B 35/6264; C04B 35/63408; C04B 35/636; C04B 2235/3481; C04B 2235/6021; C04B 2111/00129
See application file for complete search history.

(56) References Cited

U.S. PATENT DOCUMENTS

| 2,400,001 A | 5/1946 | Grupelli |
| 2,577,218 A | 12/1951 | Van Der Waarden |
| | (Continued) | |

FOREIGN PATENT DOCUMENTS

| CN | 1414930 A | 4/2003 |
| CN | 101500531 A | 8/2009 |
| | (Continued) | |

OTHER PUBLICATIONS

Chinese Patent Application No. 201880089000.X, Office Action dated Sep. 29, 2021, 4 pages (English Translation Only), Chinese Patent Office.
(Continued)

*Primary Examiner* — Noah S Wiese
(74) *Attorney, Agent, or Firm* — Joseph M. Homa (57) ABSTRACT

Green ceramic mixtures include at least one inorganic component, at least one organic binder, and a stable emulsion including at least one lubricant, at least one aqueous solvent, and at least one emulsifier. Methods for forming ceramic bodies include forming a green ceramic mixture including a stable emulsion and extruding the green ceramic mixture. The methods and green ceramic mixtures can be used to produce green and fired ceramic bodies.

18 Claims, 1 Drawing Sheet

(51) Int. Cl.
*C04B 35/634* (2006.01)
*C04B 35/64* (2006.01)
*C04B 26/28* (2006.01)

(52) U.S. Cl.
CPC ........ *C04B 35/63408* (2013.01); *C04B 35/64* (2013.01); *C04B 2235/3481* (2013.01); *C04B 2235/6021* (2013.01)

(56) References Cited

U.S. PATENT DOCUMENTS

| | | | |
|---|---|---|---|
| 2,739,365 | A | 3/1956 | Choquette |
| 2,999,063 | A | 9/1961 | Hoeppel |
| 3,050,465 | A | 8/1962 | Francis |
| 3,052,629 | A | 9/1962 | Stanley et al. |
| 3,192,159 | A | 6/1965 | Francis |
| 4,483,944 | A | 11/1984 | Day et al. |
| 4,855,265 | A | 8/1989 | Day et al. |
| 5,290,739 | A | 3/1994 | Hickman |
| 5,633,217 | A | 5/1997 | Lynn |
| 6,207,101 | B1 | 3/2001 | Beall et al. |
| 6,299,678 | B1 * | 10/2001 | Beall ............... C04B 35/632 106/196.1 |
| 6,344,078 | B1 * | 2/2002 | Beall ............... C04B 35/632 106/196.1 |
| 6,620,751 | B1 | 9/2003 | Ogunwumi |
| 6,849,181 | B2 | 2/2005 | Ogunwumi et al. |
| 6,942,713 | B2 | 9/2005 | Ogunwumi et al. |
| 7,001,861 | B2 | 2/2006 | Beall et al. |
| 7,259,120 | B2 | 8/2007 | Ellison et al. |
| 7,294,164 | B2 | 11/2007 | Merkel |
| 7,497,982 | B2 | 3/2009 | Chou |
| 7,704,296 | B2 | 4/2010 | Merkel |
| 8,557,215 | B2 | 10/2013 | Calado et al. |
| 8,809,424 | B2 | 8/2014 | Feron et al. |
| 2004/0020846 | A1 | 2/2004 | Ogunwumi et al. |
| 2004/0092381 | A1 | 5/2004 | Beall et al. |
| 2005/0091952 | A1 | 5/2005 | Ogunwumi et al. |
| 2006/0021309 | A1 | 2/2006 | Merkel |
| 2007/0090577 | A1 * | 4/2007 | Chou ............... C04B 35/632 264/638 |
| 2009/0220736 | A1 | 9/2009 | Merkel |
| 2010/0233220 | A1 | 9/2010 | Ueda et al. |

FOREIGN PATENT DOCUMENTS

| | | |
|---|---|---|
| CN | 101580394 A | 11/2009 |
| CN | 101817693 A | 9/2010 |
| CN | 102143796 A | 8/2011 |
| CN | 102173852 A | 9/2011 |
| CN | 103086735 A | 5/2013 |
| CN | 105503235 A | 4/2016 |
| CN | 106316444 A | 1/2017 |
| CN | 107075339 A | 8/2017 |
| EP | 0700718 A1 | 3/1996 |
| JP | 05-016389 A | 1/1993 |
| JP | 2003-511335 A | 3/2003 |
| WO | 01/25284 A2 | 4/2001 |
| WO | 01/49634 A1 | 7/2001 |
| WO | 2004/011386 A1 | 2/2004 |
| WO | 2005/046840 A1 | 5/2005 |
| WO | 2006/015240 A2 | 2/2006 |
| WO | 2007/047103 A2 | 4/2007 |
| WO | 2009/144665 A2 | 12/2009 |
| WO | 2019/032645 A1 | 2/2019 |

OTHER PUBLICATIONS

International Search Report and Writtenn Opinion of the International Searching Authority; PCT/US2018/065895; dated Apr. 9, 2019; 8 Pages; European Patent Office.

Lv et al; "Characterization of the Emulsions Formed by Catastrophic Phase Inversion"; Colloids and Surfaces A 450 (2014) 141-147.

* cited by examiner

GREEN CERAMIC MIXTURES COMPRISING A STABILIZED EMULSION AND METHODS FOR FORMING A CERAMIC BODY

CROSS-REFERENCE TO RELATED APPLICATIONS

This application is a National Stage application under 35 U.S.C. § 371 of International Application No. PCT/US2018/065895 filed on Dec. 16, 2018 which claims the benefit of priority under 35 U.S.C. § 119 of U.S. Provisional Application Ser. No. 62/607,593 filed on Dec. 19, 2017, the contents of which are relied upon and incorporated herein by reference in their entireties.

FIELD OF THE DISCLOSURE

The disclosure relates generally to green ceramic mixtures comprising a stable emulsion comprising at least one lubricant, at least one aqueous solvent, and at least one emulsifier. The disclosure also relates to methods for extruding such green ceramic mixtures to form a green ceramic body, which can be fired into a ceramic body.

BACKGROUND

Ceramic bodies, such as cordierite and aluminum titanate ceramic bodies, may be used in a variety of applications. For example, ceramic bodies may be useful as catalytic converters or particulate filters, which can be utilized to remove pollutants and/or particulates from fluid streams. Exemplary fluid streams may comprise gases, vapors, or liquids, and the particulates may comprise a separate phase in the fluid, such as solid particulates in a gas or liquid stream, or droplets of liquid in a gas stream, and the like. Particulates can include soot, ash, dust, aerosolized liquids, and various other particulate contaminants. Pollutants can include toxic gases or liquids, e.g., carbon monoxide, unburned hydrocarbon fuel, and the like.

SUMMARY

Illustrative embodiments of the present disclosure are directed to methods, mixtures, and green ceramic bodies that reduce or eliminate the occurrence of oil fissuring, including a method comprising: forming a stable emulsion in a green ceramic mixture comprising at least one inorganic component, at least one organic binder, at least one lubricant, at least one aqueous solvent, and at least one emulsifier, wherein the emulsion is stable under non-shear conditions for a time period of at least one hour; and extruding the green ceramic mixture to form a green ceramic body.

In some embodiments, forming the stable emulsion in the green ceramic mixture comprises: mixing the at least one lubricant, the at least one aqueous solvent, and the at least one emulsifier to form the stable emulsion; and mixing the stable emulsion with the at least one inorganic component and the at least one organic binder.

In some embodiments, mixing the at least one lubricant, the at least one aqueous solvent, and the at least one emulsifier to form the stable emulsion comprises adding the at least one emulsifier to the at least one lubricant and subsequently adding the at least one aqueous solvent.

In some embodiments, mixing the at least one lubricant, the at least one aqueous solvent, and the at least one emulsifier to form the stable emulsion comprises adding the at least one emulsifier to the at least one aqueous solvent and subsequently adding the at least one lubricant.

In some embodiments, the at least one emulsifier is chosen from oil-soluble surfactants, water-soluble surfactants, functionalized silicone compounds, fatty acids, and combinations thereof.

In some embodiments, the at least one emulsifier is chosen from saturated and unsaturated, linear and branched $C_8$-$C_{22}$ fatty acids and derivatives thereof.

In some embodiments, the at least one emulsifier is chosen from non-ionic surfactants.

In some embodiments, the at least one emulsifier is chosen from functionalized siloxanes.

In some embodiments, the at least one emulsifier is a mixture of at least one fatty acid and at least one non-ionic surfactant.

In some embodiments, the method further comprises firing the green ceramic body.

Various embodiments are directed to a green ceramic body or a fired ceramic body formed by any of the methods described above.

Illustrative embodiments of the present disclosure are also directed to a green ceramic mixture comprising: at least one inorganic component; at least one organic binder; and a stable emulsion comprising at least one lubricant, at least one aqueous solvent, and at least one emulsifier; wherein the emulsion is stable under non-shear conditions for a time period of at least one hour.

In some embodiments, the at least one inorganic component comprises a cordierite-forming powder.

In some embodiments, the at least one organic binder comprises a cellulosic binder.

In some embodiments, the at least one lubricant is chosen from mineral oils, poly alpha-olefin oils, and combinations thereof.

In some embodiments, the at least one aqueous solvent is water.

In some embodiments, the at least one emulsifier is chosen from oil-soluble surfactants, water-soluble surfactants, functionalized silicone compounds, fatty acids, and combinations thereof.

In some embodiments, the at least one emulsifier is a mixture of east one fatty acid and at least one non-ionic surfactant.

Further illustrative embodiments of the present disclosure are directed to a green ceramic body comprising: at least one inorganic component; at least one organic binder; and a stable emulsion comprising at least one lubricant, at least one aqueous solvent, and at least one emulsifier; wherein the emulsion is stable under non-shear conditions for a time period of at least one hour.

Yet further illustrative embodiments of the present disclosure are directed to a method of making a green ceramic body comprising: forming a green ceramic mixture comprising an emulsion stable under non-shear conditions; and extruding the green ceramic mixture to form the green ceramic body within one hour of forming the green ceramic mixture.

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims.

BRIEF DESCRIPTION OF THE DRAWINGS

The accompanying drawings, described below, are for illustrative purposes and are not necessarily drawn to scale. The drawings are not intended to limit the scope of the disclosure in any way. Like numerals are used throughout the specification and drawings to denote like elements.

DETAILED DESCRIPTION

Green ceramic mixtures can comprise at least one extrusion aid, such as a lubricant combined with at least one emulsifier, which are believed to provide a "slip" layer between the green ceramic mixture and the extrusion equipment walls. Extrusion aids may reduce wall drag and/or pressure within the extrusion equipment and allow for a higher feed rate and/or extrusion rate to increase production. However, the addition of these extrusion aids can lead to fissures in the extruded green body, referred to herein as "oil fissures," e.g., a bead of oil may rise to the surface of the green body and a fissure or crack can be present in the green body under the oil bead. A cracked green body cannot be repaired and is considered a loss in yield.

Without wishing or needing to be bound by theory, it is believed that oil fissuring occurs when oil leaks onto the part as it emerges from the extruder and there is a local drop in the water fraction of the liquid phase, which causes a drop in green body tensile strength. This drop in tensile strength under the oil bead results in a fissure or crack directly under the oil bead. Extrusion aids are often poor emulsifiers and can result in liquid phase emulsions that are emulsified under shear but separate when shear is removed.

It is also believed that extrusion apparatuses, such as extrusion dies, may have various "dead zones" where liquid can accumulate under non-shear conditions and the emulsion can separate. Liquid accumulated in these dead zones can have a composition that is different from the liquid phase of the green ceramic mixture, depending on the degree of separation of the emulsion. If liquid from the separated emulsion leaks onto the green body, a change in tensile properties at the leakage site can result, leading to an oil fissure.

It would be advantageous to provide green ceramic mixtures and extrusion methods that do not result in oil fissures. Without wishing or needing to be bound by theory, it is believed that incorporating a stable emulsion into the green ceramic mixture, e.g., an emulsion that can remain in an emulsified state even in non-shear conditions for a time period greater than the "dead zone" residence time, can reduce or eliminate the occurrence of oil fissuring. Even if the stable emulsion leaks onto the green body, the leaked liquid will have substantially the same composition as the liquid phase of the green ceramic mixture itself, thereby not adversely affecting the tensile strength of the green body at the leakage site.

Disclosed herein are green ceramic mixtures comprising at least one inorganic component, at least one organic binder, and a stable emulsion comprising at least one lubricant, at least one aqueous solvent, and at least one emulsifier, wherein the emulsion is stable under non-shear conditions for a time period of at least one hour.

As used herein, the terms "stable emulsion," "stabilized emulsion," and variations thereof are used interchangeably to refer to an emulsion that can maintain an emulsified state independent of shear conditions for a specified time period. An exemplary emulsion can be stable for a time period of at least an hour under non-shear conditions, e.g., in the absence of mixing, stirring, or any other movement resulting in a force that causes flow within the liquid. The time period for stability can vary, e.g., depending on the extrusion apparatus and any dead zones within said apparatus. In some embodiments, the stability time period can be greater than a residence time of the liquid phase in a dead zone within a given apparatus. For example, the emulsion may be stable for a time period greater than about 1 hour, 2 hours, 3 hours, 4 hours, 6 hours, 8 hours, 10 hours, 12 hours, 18 hours, 24 hours, or even more, depending on the extrusion apparatus, including all ranges and subranges therebetween, e.g., ranging from about 1 hour to about 24 hours.

Emulsion stability can be measured, in some embodiments, by evaluating the volume percentage of disperse liquid in suspension (e.g., for an oil-in-water emulsion, oil is the disperse phase in suspension and water is the continuous phase, and vice versa for water-in-oil emulsions). A stable emulsion may have at least about 90% of the disperse liquid in suspension, such as at least about 95%, at least about 98%, at least about 99%, or 100% of disperse liquid in suspension, including all ranges and subranges therebetween, e.g., ranging from about 90% to about 100%. Average droplet size of the disperse liquid may also be measured, e.g., using a Coulter counter, and may be less than about 10 microns, such as less than about 8 microns, less than about 5 microns, less than about 4 microns, less than about 3 microns, less than about 2 microns, or less than about 1 micron, including all ranges and subranges therebetween, e.g., ranging from about 1 micron to about 10 microns. According to various embodiments, a stable emulsion as defined herein can maintain an emulsified state with at least 95% of disperse liquid in suspension, the disperse phase having a droplet size of 10 microns or less under non-shear conditions for at least one hour, such as at least 6 hours, at least 12 hours, or at least 24 hours, or more.

As used herein, the term "green ceramic mixture" and variations thereof is intended to denote a mixture comprising inorganic components capable of being formed into a green ceramic body, which can then be fired into a ceramic body, wherein the green ceramic mixture can comprise one or more ceramic components, and/or one or more components which are capable of forming a ceramic phase or ceramic material. The green ceramic mixture can comprise a mixture of inorganic batch components and additional components, such as a binder, water, oil, and/or any other desired additive. In some embodiments, the mixture is substantially homogeneous. Green ceramic mixture can be fired to form a number of different ceramic materials. For example, the ceramic materials can comprise, but are not limited to, cordierite, aluminum titanate, silicon carbide, silicon nitride, calcium aluminate, zirconium phosphate, eucryptite, spodumene, mullite, feldspar, and the like. As such, in some embodiments, the green ceramic mixture is one of a cordierite-forming green ceramic mixture, an aluminum-titanate-forming green ceramic mixture, and so forth. According to certain embodiments, the green ceramic mixture comprises (i) green inorganic components that react to form ceramic material when fired and/or (ii) partially or fully reacted inorganic components that comprise ceramic compounds.

Inorganic components, making up the green ceramic mixture, may comprise one or more inorganic oxides or precursors thereof, collectively referred to herein as "source" materials. Sources may comprise, but are not limited to, materials that, when heated to a given temperature, alone or in the presence of other materials, will yield an inorganic oxide. In various non-limiting embodiments of the disclosure, inorganic components may comprise at least one source of alumina, silica, magnesia, titania, and/or other inorganic oxides (e.g., lanthanum, yttrium, barium, sodium, potassium, lithium, calcium, strontium, iron, boron, and phosphorous oxides), as well as other inorganic compounds such as carbonates, nitrates, and hydroxides (e.g., calcium and strontium carbonate).

In one embodiment, cordierite-forming green ceramic mixtures comprise an alumina source, a silica source, and a magnesia source, in one embodiment, an aluminum titanate-forming green ceramic mixture comprises an alumina source and a titania source.

Examples of alumina sources comprise, but are not limited to, alpha-alumina, transition aluminas such as gamma, theta, chi, and rho aluminas, hydrated alumina, gibbsite, corundum, boehmite, pseudoboehmite, aluminum hydroxide, aluminum oxyhydroxide, diaspore, kaolin, and combinations thereof. In various embodiments, the alumina source may be present in the green ceramic mixture in an amount ranging from about 25% to about 60% by weight, on an oxide basis, relative to the total weight of inorganic components in the green ceramic mixture. As used herein, the term "inorganic components" does not include any liquids (e.g., lubricant, solvent, and emulsifier) that are actively or intentionally added to the mixture. For example, the alumina source may comprise from about 30% to about 55%, from about 35% to about 50%, or from about 40% to about 45% by weight of the inorganic components, including all ranges and subranges therebetween.

Examples of silica sources comprise, but are not limited to, non-crystalline silica, such as fused silica and sol-gel silica, crystalline silica such as zeolite, quartz, and cristobalite, colloidal silica, diatomaceous silica, silicone resin, diatomaceous silica, kaolin, talc, mullite, and combinations thereof. In other embodiments, the silica source is chosen from silica-forming sources comprising at least one compound that yields silica when heated, such as, for example, silicic acid and silicone organometallic compounds. According to exemplary embodiments, the silica source is present in a cordierite-forming green ceramic mixture in an amount ranging from about 5% to about 60% by weight on an oxide basis, such as from about 8% to about 50%, from about 10% to about 40%, from about 12% to about 30%, or from about 15% to about 20% by weight on an oxide basis, relative to the total weight of the inorganic components in the green ceramic mixture, including all ranges and subranges therebetween.

Examples of magnesia sources comprise, but are not limited to, talc, magnesite, magnesium hydroxide, and combinations thereof. The magnesia source can be present in a cordierite-forming green ceramic mixture in an amount ranging from about 5% to about 25% by weight on an oxide basis, such as from about 10% to about 20%, from about 12% to about 17%, or from about 14% to about 16% by weight on an oxide basis, relative to the total weight of the inorganic components in the green ceramic mixture, including all ranges and subranges therebetween.

Examples of titania sources comprise, but are not limited to, rutile, anatase, amorphous titania, and combinations thereof. The titania source may be present in an aluminum titanate-forming green ceramic mixture in an amount ranging from about 25% to about 40% by weight on an oxide basis, such as from about 27% to about 35%, or from about 30% to about 33% by weight on an oxide basis, relative to the total weight of the inorganic components in the green ceramic mixture, including all ranges and subranges therebetween.

The green ceramic mixture, in some embodiments, further comprises at least one additional inorganic oxide, carbonate, nitrate, or hydroxide, such as lanthanum, yttrium, barium, sodium, potassium, lithium, calcium, strontium, iron, boron, and phosphorous oxides, carbonates, nitrates, and/or hydroxides. According to various embodiments, such additional components may be present in the green ceramic mixture in an amount ranging from about 3% to 50% by weight on an oxide basis, such as from about 5% to about 40%, from about 8% to about 30%, from about 10% to about 20%, or from about 12% to about 15% by weight on an oxide basis, relative to the total weight of the inorganic components in the green ceramic mixture, including all ranges and subranges therebetween. The green ceramic mixture can also comprise one or more multi-source inorganic compounds. Multi-source compounds are compounds that provide two or more oxides or precursors to the green ceramic mixture, such as kaolin or talc.

In various embodiments, the inorganic components are chosen such that the green ceramic mixture forms and/or comprises cordierite, aluminum titanate, silicon carbide, silicon nitride, calcium aluminate, zirconium phosphate, eucryptite, spudomene, mullite, or feldspar ceramic bodies. Thus, one or more inorganic components may have the same composition as the final fired composition, for example an inorganic component may be silicon carbide wherein silicon carbide particles bond, agglomerate, or sinter to one another resulting in a silicon carbide final ceramic body; or, one of the inorganic components may be cordierite wherein the final fired ceramic article comprises cordierite. Instead, or in addition, the inorganic components may comprise two or more inorganic components which react with each other in a solid phase reaction to result in a final fired composition which is different from either of the inorganic components. For example, alumina and silica can be provided as inorganic components and the final fired ceramic composition may be cordierite or aluminum titanate or another composition. In at least one embodiment, the green ceramic mixture forms an aluminum titanate ceramic body. For instance, the stoichiometry of the inorganic components within the mixture can be chosen to produce a ceramic composition comprising about 45-55 wt % alumina, about 25-35 wt % titanic, and about 5-15 wt % silica. Exemplary aluminum titanate green ceramic mixtures and the preparation thereof are described in U.S. Pat. Nos. 4,483,944, 4,855,265, 5,290,739, 6,620,751, 6,942,713, 6,849,181, 7,001,861, 7,259,120, and 7,294,164; U.S. Patent Application Publication Nos. 2004/0020846, 2004/0092381, 2006/0021309, 2005/0091952, and 2004/0092381, all of which are incorporated herein by reference in their entireties.

According to certain embodiments, the green ceramic mixture comprises a green cordierite-forming mixture, which is then formed into a green cordierite-forming ceramic body and fired into a cordierite ceramic body. For instance, the stoichiometry of the inorganic components is chosen to produce a ceramic composition comprising about 35-60 wt % silica, about 25-50 wt % alumina, and about 5-25 wt % magnesia. Exemplary green cordierite-forming mixtures and the preparation thereof are described in U.S. Pat. No. 7,704,296 and U.S. Patent Application Publication No. 2009/0220736, both of which are incorporated herein by reference in their entireties. The green cordierite-forming mixture may, in various exemplary embodiments, comprise clay or may, in other embodiments, be substantially free of clay. For example, the cordierite green ceramic mixtures can comprise less than about 1% by weight of clay, for example, less than about 0.5% by weight of clay, or less than about 0.1% by weight of clay.

The green ceramic mixtures, in various embodiments, comprise at least one organic binder, such as a water-soluble binder. By way of non-limiting example, organic binders may comprise cellulosic binders such as methylcellulose, hydroxypropyl methylcellulose, methylcellulose derivatives, and combinations thereof. Commercially available cellulose binders comprise, but are not limited to, Methocel binders sold by Dow Chemical. In certain embodiments, the at least one binder may be present in the green ceramic mixture in an amount ranging from about 1% to about 10% by weight, for example, from about 2% to about 6%, or about 3% to about 5%, by weight, relative to the total weight of the green ceramic mixture. The green ceramic mixture is the mixture that is extruded and formed into a green ceramic body.

In various embodiments, the green ceramic mixtures can further comprise at least one lubricant. For example, the green ceramic mixture may comprise at least one of mineral oil, corn oil, high molecular weight polybutenes, polyol esters, paraffin wax, and combinations thereof. In various embodiments, the at least one lubricant comprises a mineral or poly alpha-olefin oil. Commercially available lubricants can comprise, but are not limited to, Durasyn® products sold by Ineos, e.g., Durasyn® 162, and NEXBASE®3020 sold by Neste. The at least one lubricant may be present in the green ceramic mixture in an amount ranging from about 1% to about 10% by weight, such as from about 2% to about 9%, from about 3% to about 8%, from about 4% to about 7%, or from about 5% to about 6% by weight, relative to the total weight of the green ceramic mixture, including all ranges and subranges therebetween. In certain embodiments, the at least one lubricant may be present in the green ceramic mixture in an amount ranging from about 3% to about 7% by weight, relative to the total weight of the green ceramic mixture.

The green ceramic mixture comprises at least one aqueous solvent. The aqueous solvent may comprise water alone or mixtures of water and at least one water-miscible solvent, e.g., alcohols. In at least one embodiment, the aqueous solvent consists essentially of water, such as deionized water. In various non-limiting embodiments, the at least one aqueous solvent may be present in the green ceramic mixture in an amount ranging from about 15% to about 50% by weight, such as from about 20% to about 45%, from about 25% to about 40%, or from about 30% to about 35% by weight, relative to the total weight of the green ceramic mixture, including all ranges and subranges therebetween. According to certain embodiments, the at least one aqueous solvent may be present in the green ceramic mixture in an amount ranging from about 25% to about 40% by weight, relative to the total weight of the green ceramic mixture.

In some embodiments, the green ceramic mixture further comprises at least one emulsifier. Examples of emulsifiers comprise fatty acids, surfactants, functionalized silicone compounds, and other like compounds with interfacial activity. Mixtures of functionalized silicone compounds, fatty acids, and/or surfactants may also be used in some embodiments. The at least one emulsifier may be present in the green ceramic mixture in an amount ranging from about 0.05% to about 3% by weight, such as from about 0.1% to about 2.5%, from about 0.5% to about 2%, or from about 1% to about 1.5% by weight, relative to the total weight of the green ceramic mixture, including all ranges and subranges therebetween.

Fatty acids may comprise saturated and unsaturated, linear and branched fatty acids, such as $C_8$-$C_{22}$ fatty acids and derivatives thereof, e.g., stearic acid, lauric acid, oleic acid, linoleic acid, and palmitoleic acid. Other exemplary fatty acids comprise tall oil, olean white, palmitic acid, and mixtures of fatty acids, such as mixtures comprising lauric acid, mixtures comprising oleic acid, and mixtures comprising stearic acid, such as Emersol® 213 (E213) and Emersol® 120 (E120). Mixtures of fatty acids and esters may also be used in some embodiments. In certain embodiments, the at least one fatty acid may be present in the green ceramic mixture in an amount ranging from about 0.1% to about 2% by weight, relative to the total weight of the green ceramic mixture.

Non-limiting examples of surfactants comprise $C_8$-$C_{22}$ fatty alcohols, sulfates, esters, ethers, ethylene oxides, and combinations thereof. In certain embodiments, the at least one surfactant is chosen from ammonium lauryl sulfate, polyethylene glycol alkyl ethers, sorbitan esters, ethoxylated sorbitan esters, polysorbates, ethylene oxides, and combinations thereof. According to non-limiting embodiments, the at least one surfactant is chosen from non-ionic surfactants. Commercially available surfactants comprise, but are not limited to, Brij®, Span®, and Tween surfactants, e.g., Brij® 30, 35, 93, 97, and 98; Span® 20, 40, 60, 80, 83, 85, and 120; and Tween 20, 21, 40, 60, 61, 65, and 80. In certain embodiments, the at least one surfactant is present in the green ceramic mixture in an amount ranging from about 0.05% to about 1.5% by weight, relative to the total weight of the green ceramic mixture.

Exemplary functionalized silicone compounds can comprise, but are not limited to, functionalized siloxanes. Exemplary functional groups can comprise, but are not limited to, hydroxyl (OH), carboxyl (COOH), and hydroxyl-terminated ethylene oxide $(EO)_pOH$ groups, or combinations thereof. For instance, the functionalized silicone compound may be chosen from compounds of formula (I):

wherein n can range from 1 to 70, such as from 2 to 60, from 3 to 50, from 4 to 40, from 5 to 30, from 6 to 20, from 7 to 10, or from 8 to 9, including all ranges and subranges therebetween, and wherein X is a functional group, e.g., a hydroxyl group, a carboxyl group, or a hydroxyl-terminated ethylene oxide group. While the compounds of formula (I) are illustrated as bidentate compounds, it is also possible to utilize monodentate silicone compounds, e.g., compounds substituted with only one functional group X. Exemplary functionalized siloxane compounds can comprise compounds of formulae (II)-(IV):

-continued (III)

(IV)

wherein n is as defined above, m ranges from 1 to 15, such as from 2 to 12, from 3 to 10, from 4 to 9, from 5 to 8, or from 6 to 7, including all ranges and subranges therebetween, and p ranges from 1 to 4, such as from 2 to 3, including all ranges and subranges therebetween. Monodentate silicone compounds comprising the functional groups depicted in formulae (II)-(IV) may also be used in some embodiments.

According to various embodiments, functional group X comprises a hydrocarbon chain and at least one hydroxyl group. The hydrocarbon chain, in non-limiting embodiments, comprises 15 carbon atoms or less, such as $C_1$-$C_{15}$ carbon chains, $C_2$-$C_{12}$ carbon chains, $C_3$-$C_{10}$ carbon chains, $C_4$-$C_9$ carbon chains, $C_5$-$C_8$ carbon chains, or $C_6$-$C_7$ carbon chains. The hydrocarbon chain may be saturated or unsaturated, linear, branched, or cyclic, and/or unsubstituted or substituted with at least one heteroatom, such as N, O, or S. In some embodiments, the at least one functionalized silicone compound is present in the green ceramic mixture in an amount ranging from about 0.05% to about 1% by weight, relative to the total weight of the green ceramic mixture.

The lubricant, aqueous solvent, and functionalized silicone compound, in various embodiments, are present in the green ceramic mixture in the form of an emulsion, such as an oil-in-water emulsion or a water-in-oil emulsion. As such, the relative amounts of each of these components on a weight basis relative to the total weight of the emulsion may vary. Relative amounts within the emulsion are calculated based on the assumption that each of the lubricant, aqueous solvent, and emulsifier components fully (100%) participate in the emulsion, but portions of each of these components may be present outside of the emulsion, e.g., intermixed with the inorganic components and/or the binder, or any other component present in the green ceramic mixture. According to non-limiting embodiments, the stable emulsion is an oil-in-water emulsion.

In some embodiments, the at least one lubricant is present in the emulsion in an amount ranging from about 3% to about 30% by weight, such as from about 4% to about 25%, from about 5% to about 20%, or from about 10% to about 15% by weight, relative to the total weight of the lubricant, aqueous solvent, and emulsifier, including all ranges and subranges therebetween. The at least one aqueous solvent may be present in the emulsion in an amount of at least about 75%, such as ranging from about 75% to about 95% by weight, from about 80% to about 92%, from about 82% to about 90%, or from about 85% to about 88% by weight, relative to the total weight of the lubricant, aqueous solvent, and emulsifier, including all ranges and subranges therebetween. The at least one emulsifier may be present in the emulsion in an amount ranging from about 0.1% to about 10% by weight, such as from about 0.2% to about 9%, from about 0.3% to about 8%, from about 0.5% to about 7%, from about 1% to about 6%, from about 2% to about 5%, or from about 3% to about 4% by weight, relative to the total weight of the lubricant, aqueous solvent, and emulsifier, including all ranges and subranges therebetween. In certain embodiments, the at least one lubricant is present in the emulsion in an amount ranging from about 10% to about 20% by weight, the at least one aqueous solvent os present in the emulsion in an amount ranging from about 80% to about 90% by weight, and the at least one emulsifier is present in the emulsion in an amount ranging from about 0.2% to about 4% by weight, relative to the total weight of the lubricant, aqueous solvent, and emulsifier.

The green ceramic mixture preferably, but optionally, comprises at least one pore former. A pore former is a particulate substance that burns out of the ceramic green body during firing to create pores in the fired ceramic body. Examples of pore formers comprise, but are not limited to, carbon pore formers, such as graphite, activated carbon, petroleum coke, and carbon black; starch pore formers, such as corn, barley, bean, potato rice, tapioca, pea, sago palm, wheat, canna, and walnut shell flours; polymer pore formers, such as polybutylene, polymethylpentene, polyethylene, polypropylene, polystyrene, polyamides (nylons), epoxies, ABS, acrylics, and polyesters (PET); and combinations thereof. According to at least one embodiment, the at least one pore former is chosen from carbon pore formers such as graphite and starch pore formers such as rice corn, sago palm, and potato. In various non-limiting embodiments, the at least one pore former is present in the green ceramic mixture in an amount ranging from about 1% to about 40% by weight, for example, from about 5% to about 30%, from about 10% to about 25%, or from about 15% to about 20% by weight, relative to the total weight of the green ceramic mixture, including all ranges and subranges therebetween. In certain embodiments, the green ceramic mixture comprises two or more types of pore formers, such as three or more pore formers. For example, a combination of polymer and carbon pore formers, a combination of carbon and starch pore formers, or a combination of polymer and starch pore formers may be used, without limitation.

The disclosure also relates to methods for producing a ceramic body, the methods comprising mixing materials to form a green ceramic mixture, wherein the materials comprise at least one inorganic component, at least one organic binder, at least one lubricant, at least one aqueous solvent, and at least one emulsifier; forming a stable emulsion in the green ceramic mixture, the stable emulsion comprising the at least one lubricant, the at least one aqueous solvent, and the at least one emulsifier, wherein the emulsion is stable under non-shear conditions for a time period of at least one hour; and extruding the green ceramic mixture to form a green ceramic body. In some embodiments, the green ceramic mixture is extruded while the lubricant and aqueous solvent are in an emulsion state. For example, the green ceramic mixture is extruded to form the green ceramic body within a specific time of forming the green ceramic mixture (e.g., within one-hour, two-hours, three-hours, five-hours, or 10-hours of forming the green ceramic mixture).

The materials may be mixed using any suitable method known in the art. In various embodiments, the inorganic components comprise dry powders, which can be mixed in some embodiments to form a substantially homogeneous dry mixture. For example, the inorganic components may be pre-combined to form a substantially dry mixture and may be subsequently wet and/or plasticized by the addition of one or more of the lubricant, solvent, binder, and/or emulsifier. Optionally, the at least one pore former may also be blended with the inorganic components to form a dry mixture. According to certain non-limiting embodiments, all wet and dry materials are mixed together, in any order or sub-combination, to form a green ceramic mixture comprising the stable emulsion, e.g., the stable emulsion may be formed in situ during mixing.

In alternative embodiments, the lubricant, solvent, and emulsifier are pre-mixed to form a stable emulsion that is subsequently combined with the dry materials, e.g., the inorganic components and/or pore former. According to various embodiments, pre-mixing comprises adding the at least one aqueous solvent to a mixture of the at least one lubricant and the at least one emulsifier. In other embodiments, pre-mixing comprise mixing the at least one aqueous solvent and the at least one emulsifier and adding the mixture to the at least one lubricant.

The individual components of the green ceramic mixture, regardless of the order of addition, may be mixed to form a substantially homogeneous mixture. By way of non-limiting example, the materials may be mixed or kneaded, e.g., using a ribbon mixer, twin-screw extruder/mixer, auger mixer, muller mixer, or double-arm mixer.

The green ceramic mixture can then be extruded to form a green ceramic body, such as a self-supporting green ceramic body. For instance, the green ceramic mixture can be extruded, e.g., vertically or horizontally, using a hydraulic ram extrusion press, a single auger extruder, or a twin-screw mixer, with a die assembly attached to the discharge end. According to various embodiments, the green ceramic mixture can be extruded to form a ceramic green body comprising a honeycomb configuration comprising a plurality of walls forming channels having one or more desired channel shapes, wall thicknesses, and/or cell densities.

Figure 1A:
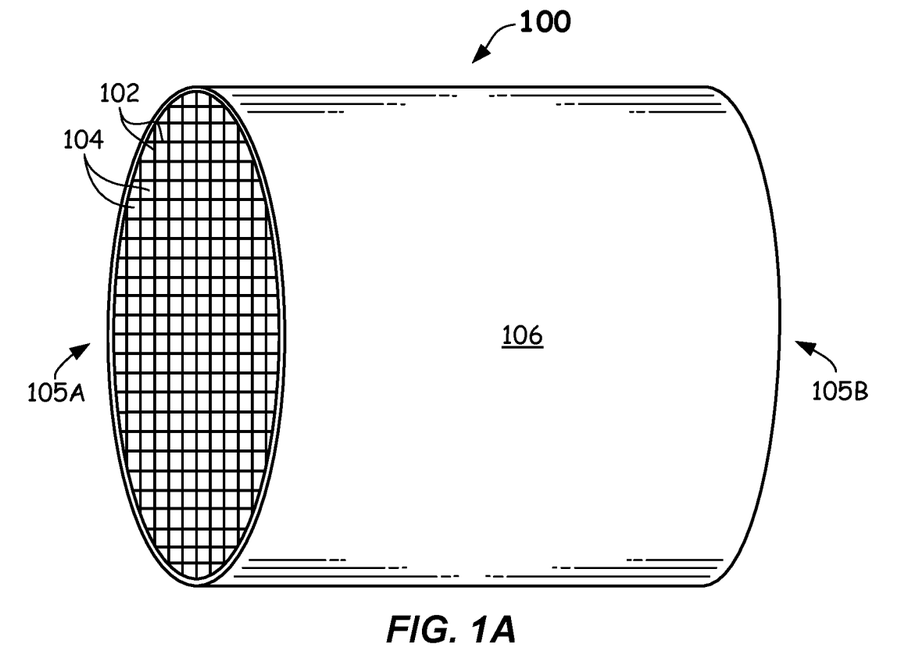
FIG. 1A schematically illustrates a perspective view of an example ceramic honeycomb body.
Figure 1B:
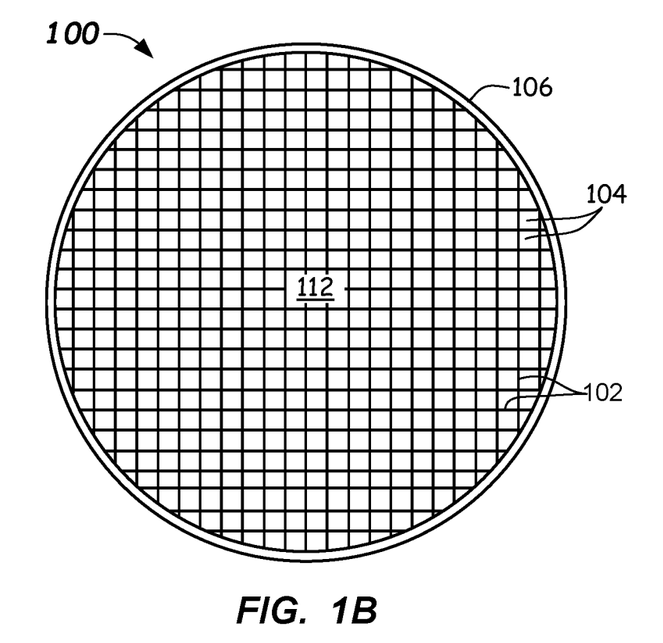
FIG. 1B schematically illustrates an end plan view of the honeycomb body of FIG. 1A.

FIGS. 1A and 1B illustrate an example ceramic honeycomb body 100, which may be a green ceramic body (before firing) or a fired ceramic body (after firing), in accordance with some embodiments of this disclosure. Ceramic honeycomb body 100 comprises a honeycomb structure 112 comprising a matrix of a plurality of intersecting walls 102 that form channels 104, which extend longitudinally from a first end 105A to a second end 105B. Channels 104 may be formed by orthogonally intersecting walls 102 (as shown) in some embodiments. A skin 106 can be disposed on an outer peripheral region of the matrix of intersecting walls 102. A rectangular (e.g., square) cross-sectional channel shape in transverse cross-section is shown. However other cross-sectional channel shapes in transverse cross-section may be used, such as rectangular (non-square), hexagonal, octagonal, diamond, triangular, and combinations thereof.

As used herein, the term "green ceramic body" and variations thereof are intended to denote an unfired and, in some embodiments, an unreacted precursor mixture, which has been extruded and, preferably, results in a self-standing green body after extrusion. The green body is preferably a self-standing body upon extrusion, and more preferably upon drying of the green body and during firing. The green body is preferably dried and is still considered a green body until final firing, sintering, calcination, or other reactive processing. In certain embodiments, the green body may be dried using air drying, hot-air drying, dielectric drying, microwave drying, vacuum drying, or freeze drying, A "fired" or "sintered" ceramic body and variations thereof is intended to denote a ceramic body that has undergone firing in conditions effective to convert the green ceramic mixture into a final ceramic composition. The ceramic body may also undergo calcination during the firing process.

The green body is, in some embodiments, fired to form a ceramic body. By way of non-limiting example, firing can occur at a temperature ranging from about 1200° C. to about 1600° C., such as from about 1250° C. to about 1500° C., from about 1300° C. to about 1450° C., or from about 1350° C. to about 1400° C., including all ranges and subranges therebetween. Exemplary firing times may range from about 1 hour to about 200 hours, such as from about 2 hours to about 100 hours, from about 3 hours to about 50 hours, from about 5 hours to about 25 hours, or from about 10 hours to about 20 hours, including all ranges and subranges therebetween.

The firing process may optionally comprise a heating stage that burns out organic components such as the pore former, binder, surfactant, oil, and/or emulsifier. For instance, the binder may have a combustion temperature ranging from about 200° C. to about 300° C. and the pore former may have a combustion temperature ranging from about 300° C. to about 1000° C. During the heating stage, the green ceramic can be exposed to a temperature ranging from about 200° C. to about 1000° C., such as from about 300° C. to about 800° C., from about 400° C. to about 700° C., or from about 500° C. to about 600° C., including all ranges and subranges therebetween.

The methods and/or green ceramic mixtures disclosed herein can be used to form a green ceramic body of a desired shape and/or dimension, including cellular bodies such as honeycomb bodies. For example, the green ceramic mixtures disclosed herein can be extruded or otherwise formed to produce a green ceramic body having a desired shape, such as a honeycomb-shaped body. A green ceramic body can have a 3-dimensional shape, such as a cube, block, pyramid, cylinder, sphere, or the like, with a width, length, height, and/or diameter. In various embodiments, the green ceramic body is formed as a monolithic structure, for example, via extruding and/or molding techniques. Those having ordinary skill in the art are familiar with the various techniques for forming such ceramic monolithic structures. The green ceramic body may be subsequently fired to produce a fired ceramic body having the desired shape and composition.

In some embodiments, a sintered ceramic body or fired ceramic body comprises a porous ceramic structure (or microstructure). A highly porous ceramic as disclosed herein can comprise a ceramic structure having a porosity, in some embodiments, of at least about 40%, such as about 45%, 50%, 55%, 60%, 65%, 70%, 75%, 80%, 85%, or greater. Porous ceramic structures may also have any variety of configurations and designs including, but not limited to, flow-through monolith, wall-flow plugged monolith, or partial-flow (partially plugged) monolith structures. Exemplary flow-through monoliths comprise walls forming channels, porous networks, or other passages through which fluid can flow from one end of the structure to the other. Exemplary wall-flow monoliths comprise, for example, walls forming channels or porous networks or other passages which may be open or plugged at opposite ends of the structure, thereby capable of directing fluid flow through the channel walls as it flows from one end of the structure to the other. Exemplary partial-flow monoliths can comprise a combination of features of a wall-flow monolith and a flow-through monolith, e.g., having some channels or passages open at both ends to permit some of the fluid to flow through the channel with minimal resistance. Segmented structures are also contemplated herein which can comprise two or more honeycomb blocks joined together, wherein each honeycomb block is a separate monolith.

In certain embodiments, the green or fired ceramic body has a honeycomb shape, e.g., comprising a plurality of walls forming parallel cells defining channels. The cellular geometry of the honeycomb configuration is often used for filtration due to its high surface area per unit volume, such as for increased deposition of particulate matter. The honeycomb structure can comprise a plurality of interior walls separating and defining the plurality of channels. Additionally, one or more of the channels can comprise plugs, which can be used to direct or increase fluid flow through the interior channel walls. The honeycomb channels may have a substantially quadrilateral or hexagonal cross-section or can have any other suitable geometry, for example, circular, square, triangular, rectangular, or sinusoidal cross-sections, or any combination thereof.

Honeycomb bodies are often described in terms of cells (or channels) per square inch of surface area, as well as interior wall thickness (typically in mils or $10^{-3}$ inches). For example, a honeycomb body comprising 300 cells/in$^2$ and a wall thickness of 0.008 inches would be labeled as a 300/8 honeycomb, and so forth. Exemplary honeycomb bodies may comprise from about 100 to about 500 cells/in$^2$ (15.5-77.5 cells/cm$^2$), such as from about 150 to about 400 cells/in$^2$ (23.25-62 cells/cm$^2$), or from about 200 to about 300 cells/in$^2$ (31-46.5 cells/cm$^2$), including all ranges and subranges therebetween. According to additional embodiments, the interior wall thickness can range from about 0.005 to about 0.02 inches (127-508 microns), such as from about 0.006 to about 0.015 inches (152-381 microns), from about 0.007 to about 0.012 inches (177-305 microns), or from about 0.008 to about 0.01 inches (203-254 microns), e.g., about $5 \times 10^{-3}$, $6 \times 10^{-3}$, $7 \times 10^{-3}$, $8 \times 10^{-3}$, $9 \times 10^{-3}$, $10 \times 10^{-3}$, $12 \times 10^{-3}$, $14 \times 10^{-3}$, $16 \times 10^{-3}$, $18 \times 10^{-3}$, or $20 \times 10^{-3}$ inches, including all ranges and subranges therebetween.

Honeycomb lengths and/or diameters can range in some embodiments from one to several inches, such as from about 1 inch to about 12 inches (2.54-30.48 cm), from about 2 inches to about 11 inches (5.08-27.94 cm), from about 3 inches to about 10 inches (7.62-25.4 cm), from about 4 inches to about 9 inches (10.16-22.86 cm), from about 5 inches to about 8 inches (12.7-20.32 cm), or from about 6 inches to about 7 inches (15.24-17.78 cm), including all ranges and subranges therebetween. The total volume of such honeycomb bodies can range, in some embodiments, from about 0.1 L to about 20 L, such as from about 0.5 L to about 18 L, from about 1 L to about 16 L, from about 2 L to about 14 L, from about 3 L to about 12 L, from about 4 L to about 10 L, or from about 5 L to about 8 L, including all ranges and subranges therebetween.

The green and/or fired ceramic body, in certain embodiments, comprises an outer peripheral wall or outer skin and an interior core. For example, the outer skin may form a porous outer surface of the filter and the interior core can comprise walls comprising a different porous microstructure (e.g., a plurality of channels). The material forming the outer skin and interior walls may be the same or different and, in some embodiments, the outer skin can have a thickness different than the interior wall thickness. The outer skin, in some embodiments, has a porosity different than that of the interior walls, e.g., can be made of a different material or can be made of the same material with a higher or lower porosity. In various exemplary embodiments, the skin is extruded and/or molded together with the core of the honeycomb. In other exemplary embodiments, the skin is a separate structure wrapped around the outside of the core and fired together with the core to create a ceramic structure.

According to certain non-limiting embodiments, the fired ceramic body can have a median pore size ($d_{50}$) of less than about 30 microns, such as ranging from about 8 microns to about 30 microns, from about 10 microns to about 25 microns, or from about 15 microns to about 20 microns, including all ranges and subranges in between, e.g., about 8, 9, 10, 11, 12, 13, 14, 15, 16, 17, 18, 19, 20, 21, 22, 23, 24, 25, 26, 27, 28, 29, or 30 microns. For instance, the $d_{50}$ value can range from about 12 microns to about 23 microns, such as from about 13 microns to about 22 microns, from about 14 microns to about 21 microns, from about 15 microns to about 20 microns, from about 16 microns to about 19 microns, or from about 17 microns to about 18 microns, including all ranges and subranges therebetween. As used herein, median pore sizes are measured via mercury porosimetry.

Additionally, in some embodiments, it may be desirable to limit the number of larger pores in the ceramic body, e.g., such that pores greater than 30 microns make up less than about 10% of the total porosity ($d_{90}$=30 microns). For example, pores greater than 30 microns may make up less than about 8%, less than about 5%, or less than about 2% of the total porosity. In various embodiments, the $d_{90}$ value can range from about 20 microns to about 50 microns, such as from about 25 microns to about 40 microns, or from about 30 microns to about 35 microns, including all ranges and subranges therebetween. Similarly, according to certain embodiments, it may be desirable to limit the number of smaller pores in the ceramic body, e.g., such that pores less than 5 microns make up less than about 10% of the total porosity ($d_{10}$=5 microns). For example, pores smaller than 5 microns may make up less than about 8%, less than about 5%, or less than about 2% of the total porosity. In various embodiments, the $d_{10}$ value can range from about 3 microns to about 15 microns, such as from about 4 microns to about 14 microns, from about 5 microns to about 12 microns, from about 6 microns to about 11 microns, from about 7 microns to about 10 microns, or from about 8 microns to about 9 microns, including all ranges and subranges therebetween.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a channel" includes examples having one such "channel" or two or more such "channels" unless the context clearly indicates otherwise. Similarly, a "plurality" or an "array" is intended to denote two or more, such that an "array of channels" or a "plurality of channels" denotes two or more such channels.

As used herein, when values are expressed as approximations, by use of the antecedent "about," then both the approximation of the value and the exact value are disclosed. Also, when a value is stated as an endpoint in a range, then both (i) the value in relation to the other endpoint and (ii) the value independent of the other endpoint are disclosed. Furthermore, as used herein, "at least one of X, Y, and Z" can be construed as X only, Y only, Z only, or any combination of two or more items X, Y, and Z (e.g., XYZ, XY, XZ, YZ). Furthermore, it will be understood that for the purposes of this disclosure, "X, Y, and/or Z" can be construed as X only, Y only, Z only, or any combination of two or more items X, Y, and Z (e.g., e.g., XYZ, XY, XZ, YZ).

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

The following Examples are intended to be non-restrictive and illustrative only, with the scope of the invention being defined by the claims.

EXAMPLES

Example 1

The emulsion stability for a cordierite-forming green ceramic mixture was evaluated using a catastrophic phase inversion technique. The emulsion was assumed to comprise only the liquid components (water, poly alpha-olephin, emulsifier) and their relative amounts in the emulsion were calculated as: 80.4 wt % water, 17.4 wt % poly alpha-olefin, and 2.2 wt % emulsifier.

The poly alpha-olefin and emulsifier were added to vials, followed by the addition of water with vigorous stirring to create emulsions. The amounts of each liquid component in the emulsion are given in Table I below:

TABLE I

Exemplary Emulsions

| Ex. | Water (wt %) | Poly alpha-olefin (wt %) | Emulsifier (wt %) |
|---|---|---|---|
| A | 80.4% | 17.4% | 2.2% oleic acid (E213) |
| B | 80.4% | 17.4% | 1.98% oleic acid (E213) 0.22% Brij ® 93 |
| C | 80.4% | 17.4% | 1.76% oleic acid (E123) 0.44% Brij ® 93 |

After vigorous stirring, each vial was visually evaluated for phase separation. Example A immediately separated into a two-phase system after stirring was stopped and did not form a stable emulsion. Example B formed a milky white emulsion during stirring, and remained milky white after stirring was stopped, but separated to form a clear two-phase system after 45 minutes. Example B did not form a stable emulsion. Example C formed a milky white emulsion and remained in emulsion after standing overnight for 12 hours. The emulsion of Example C remained stable for up to 3 days. Oleic acid (E213) is a weak fatty acid emulsifier, whereas Brij® 93 is a powerful hydrophobic surfactant emulsifier. Without wishing or needing to be bound by theory, it is believed that the emulsion stability was improved by increasing the amount of Brij® 93, e.g., by replacing at least a portion of the fatty acid emulsifier with the more powerful surfactant emulsifier.

For the given green ceramic mixture, it was determined that the 0.82 wt % oleic acid emulsifier should be at least partially replaced with Brij® 93, e.g., between about 0.082 wt % and 0.164 wt % Brij® 93 (as measured relative to the total mixture weight) should be employed to achieve a stable emulsion, e.g., an emulsion stable for at least an hour under non-shear conditions. The type and/or amount of emulsifier can vary depending on the emulsifier type(s), the materials, and/or the overall mixture composition. However, the above experiment can be conducted for any given green ceramic mixture to determine the amount/type of emulsifier appropriate to achieve a stable emulsion in the liquid phase of the mixture.

Example 2

Oil-soluble emulsifiers can be useful for providing high slip and low wall drag, but may adversely impact the tensile strength of the resulting green ceramic body due to a lower water fraction in the green ceramic mixture. For ceramic mixtures that can be run at a higher wall drag, it may be possible to increase the water fraction by incorporating a water-based emulsifier. This hypothesis was tested by evaluating emulsions comprising Tween 80 and oleic acid (E213) using a catastrophic phase inversion technique. Tween 80 is a water-soluble non-ionic surfactant.

In Example D, the poly alpha-olephin and emulsifier were added to a vial, followed by the addition of emulsifier (90% E213; 10% Tween 80). Water was subsequently added with vigorous stirring to create an emulsion. In Example E, the emulsifier (90% E213; 10% Tween 80) was dissolved in water and added to the poly alpha-olefin in the vial with vigorous stirring to create an emulsion. After vigorous stirring, each vial was visually evaluated for phase separation. Both Examples D and E formed milky white emulsions during stirring and remained milky white after stirring was stopped. However, Example D remained in emulsion after standing overnight for 12 hours, whereas Example E separated into a two-phase system after standing overnight. Without wishing or needing to be bound by theory, it is believed that water-soluble emulsifiers may have improved emulsion stability if added to the oil phase rather than the water phase. Of course, these results may vary depending on the emulsifier type and/or amount and/or the lubricant type and/or amount. Again, the above experiment can be used to determine the addition order appropriate for a given green ceramic mixture.

What is claimed is:

1. A method comprising:
    forming a stable emulsion in a green ceramic mixture comprising at least one inorganic component, at least one organic binder, at least one lubricant, at least one aqueous solvent, and at least one emulsifier, wherein the emulsion is stable under non-shear conditions for a time period of at least one hour, and wherein the at least one emulsifier is a functionalized siloxane; and
    extruding the green ceramic mixture to form a green ceramic body.

2. The method of claim 1, wherein forming the stable emulsion in the green ceramic mixture comprises:
    mixing the at least one lubricant, the at least one aqueous solvent, and the at least one emulsifier to form the stable emulsion; and
    mixing the stable emulsion with the at least one inorganic component and the at least one organic binder.

3. The method of claim 2, wherein mixing the at least one lubricant, the at least one aqueous solvent, and the at least one emulsifier to form the stable emulsion comprises adding the at least one emulsifier to the at least one lubricant and subsequently adding the at least one aqueous solvent.

4. The method of claim 2, wherein mixing the at least one lubricant, the at least one aqueous solvent, and the at least one emulsifier to form the stable emulsion comprises adding the at least one emulsifier to the at least one aqueous solvent and subsequently adding the at least one lubricant.

5. The method of claim 1, further comprising firing the green ceramic body.

6. A fired ceramic body formed by the method of claim 5.

7. The method of claim 1, wherein the functionalized siloxane is a compound of formula (I):

wherein n is an integer from 1 to 70; and
each X comprises a saturated or unsaturated hydrocarbon chain comprising 15 carbons or less and an —OH group, the hydrocarbon chain optionally substituted with at least one heteroatom selected from N, O, or S.

8. The method of claim 7, wherein X is —OH, —$CO_2H$, —$(CH_2)_mCO_2H$, or —$(CH_2)_m(OCH_2CH_2)_pOH$;
each m is an integer from 1 to 15; and
each p is an integer from 1 to 4.

9. A green ceramic mixture comprising:
at least one inorganic component;
at least one organic binder; and
a stable emulsion comprising at least one lubricant, at least one aqueous solvent, and at least one emulsifier;
wherein the at least one emulsifier is a functionalized siloxane; and
wherein the emulsion is stable under non-shear conditions for a time period of at least one hour.

10. The mixture of claim 9, wherein the at least one inorganic component comprises a cordierite-forming powder.

11. The mixture of claim 9, wherein the at least one organic binder comprises a cellulosic binder.

12. The mixture of claim 9, wherein the at least one lubricant is chosen from mineral oils, poly alpha-olefin oils, and combinations thereof.

13. The mixture of claim 9, wherein the at least one aqueous solvent is water.

14. The mixture of claim 9, wherein the functionalized siloxane is a compound of formula (I):

wherein n is an integer from 1 to 70; and
each X comprises a saturated or unsaturated hydrocarbon chain comprising 15 carbons or less and an —OH group, the hydrocarbon chain optionally substituted with at least one heteroatom selected from N, O, S.

15. The mixture of claim 14, wherein X is —OH, —$CO_2H$, —$(CH_2)_mCO_2H$, or —$(CH_2)_m(OCH_2CH_2)_pOH$;
each m is an integer from 1 to 15; and
each p is an integer from 1 to 4.

16. A green ceramic body comprising:
at least one inorganic component;
at last one organic binder; and
a stable emulsion comprising at least one lubricant, at least one aqueous solvent, and at least one emulsifier;
wherein the at least one emulsifier is a functionalized siloxane; and
wherein the emulsion is stable under non-shear conditions for a time period of at least one hour.

17. The body of claim 16, wherein the functionalized siloxane is a compound of formula (I):

wherein n is an integer from 1 to 70; and
each X comprises a saturated or unsaturated hydrocarbon chain comprising 15 carbons or less and an —OH group, the hydrocarbon chain optionally substituted with at least one heteroatom selected from N, O, S.

18. The body of claim 17, wherein X is —OH, —$CO_2H$, —$(CH_2)_mCO_2H$, or —$(CH_2)_m(OCH_2CH_2)_pOH$;
each m is an integer from 1 to 15; and
each p is an integer from 1 to 4.

* * * * *

UNITED STATES PATENT AND TRADEMARK OFFICE
CERTIFICATE OF CORRECTION

| | | |
|---|---|---|
| PATENT NO. | : 11,505,499 B2 | |
| APPLICATION NO. | : 16/954233 | |
| DATED | : November 22, 2022 | |
| INVENTOR(S) | : Mark Alan Lewis | |

It is certified that error appears in the above-identified patent and that said Letters Patent is hereby corrected as shown below:

On the Title Page

On the page 2, in Column 2, under item (56) "Other Publications", Line 1, delete "Writtenn" and insert -- Written --.

In the Claims

In Column 18, Line 19, in Claim 16, delete "at last" and insert -- at least --.

Signed and Sealed this
First Day of August, 2023

Katherine Kelly Vidal
*Director of the United States Patent and Trademark Office*